United States Patent [19]
Baker et al.

[11] 3,885,948
[45] May 27, 1975

[54] META-SUBSTITUTED ETHER ANILIDES AS ALGICIDAL AGENTS

[75] Inventors: Don R. Baker, Orinda; Eugene G. Teach, El Cerrito, both of Calif.; Duane R. Arneklev, Antelope, Mont.

[73] Assignee: Stauffer Chemical Company, Westport, Conn.

[22] Filed: Jan. 4, 1973

[21] Appl. No.: 321,085

[52] U.S. Cl. ............ 71/67; 71/118; 71/120; 260/551 R; 260/553 A; 260/553 E
[51] Int. Cl. ............ A01n 9/20
[58] Field of Search ............ 71/67, 118, 120

[56] References Cited
UNITED STATES PATENTS
3,682,618  8/1972  Mitchell et al. ............ 71/120
3,792,994  2/1974  Baker et al. ............ 71/67

*Primary Examiner*—Lewis Gotts
*Assistant Examiner*—Catherine L. Mills
*Attorney, Agent, or Firm*—Harry A. Pacini; Daniel C. Block; Edwin H. Baker

[57] ABSTRACT

This invention relates to the utility of certain meta-substituted ether anilides of the general formula

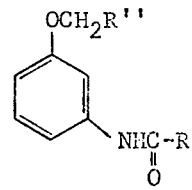

wherein R is alkyl or mono and di-substituted amino, said substituents selected from lower alkyl, alkenyl or phenyl; R″ is alkyl; alkoxyalkyl or alkylcarbonyl as algicidal agents.

28 Claims, No Drawings

META-SUBSTITUTED ETHER ANILIDES AS ALGICIDAL AGENTS

This invention relates to the utility as algicidal agents for the control of algae when used in an algicidally effective amount of certain meta-substituted ether anilides of the general formula

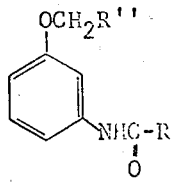

wherein R is selected from the group consisting of alkyl having 1 to 6 carbon atoms, inclusive, and mono- and di-substituted amino, said substituents selected form the group lower alkyl having 1 to 4 carbon atoms, inclusive, alkenyl having 2 to 4 carbon atoms, inclusive, and phenyl; and R'' is selected from the group consisting of alkyl having 1 to 7 carbon atoms, inclusive, alkoxyalkyl having 2 to 6 carbon atoms, inclusive, and alkylcarbonyl having from 2 to 6 carbon atoms, inclusive. It was found that these compounds have an algicidal effect and provide beneficial results in controlling the growth of algae.

Controlling the growth of algae by employing the compounds described herein can be accomplished by applying an algicidally effective amount to the environment in which algae growth is encouraged. The compounds may be applied to any environmental area which is a host to algae or susceptible to algae attack and growth. By controlling, it is meant the inhibition and prevention of the growth of the organism to be controlled.

The following compounds in Table I can be used, for example, according to the invention hereindescribed. Compound numbers have been assigned and are used throughout the balance of this application.

TABLE 1

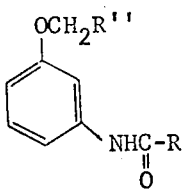

| COMPOUND NUMBER | R | R'' | PHYSICAL CONSTANT m.p. (°C) or $n_D^{30}$ |
|---|---|---|---|
| 1 | —N(H)CH₃ | —CH₂C(CH₃)₃ | 98.5–101 |
| 2 | —CH(CH₃)₂CH₂CH₂CH₃ | —CH₂C(CH₃)₃ | 1.5030 |
| 3 | —N(H)CH₂CH₃ | —CH₂C(CH₃)₃ | 109–111 |
| 4 | —C(CH₃)₂C₃H₇ | —CH₂C(CH₃)₃ | 1.5042 |
| 5 | —CH(CH₃)C₃H₇ | —C(O)C(CH₃)₃ | 1.5180 |
| 6 | —N(H)CH₂CH=CH₂ | —C(O)C(CH₃)₃ | 1.5413 |
| 7 | —N(CH₃)CH₃ | —CH(CH₃)₂ | 89–95 |
| 8 | —C₂H₅ | —CH₂C(CH₃)₃ | 1.5108 |
| 9 | —C₂H₅ | —C(O)C(CH₃)₃ | 1.5162 |
| 10 | —N(H)CH₃ | —CH(CH₃)₂ | 124–126 |
| 11 | —N(H)CH₃ | —C(O)C(CH₃)₃ | 1.5268 |

-Continued

| COMPOUND NUMBER | R | R'' | PHYSICAL CONSTANT m.p. (°C) or $n_D^{30}$ |
|---|---|---|---|
| 12 | —N(H)n—C₄H₉ | —CH₂C(CH₃)₃ | 1.5390 |
| 13 | —N(H)t—C₄H₉ | —CH₂C(CH₃)₃ | Glass |
| 14 | —N(H)CH₃ | —CH₂OC₂H₅ | 1.5450 |
| 15 | —N(CH₃)CH₃ | —CH₂OC₂H₅ | 1.5408 |
| 16 | —N(H)C₆H₅ | —C(O)C(CH₃)₃ | 85–89 |
| 17 | —i—C₃H₇ | —C(O)C(CH₃)₃ | 1.5182 |
| 18 | —t—C₄H₉ | —C(O)C(CH₃)₃ | 1.5119 |

The compounds mentioned thus far, and those contemplated, can be produced, for example, according to the following general methods and specific examples.

The compounds of the present invention are prepared by several different methods, depending upon the nature of the starting materials and the products desired. Either of the group —CH₂R'' or

can be first formed on the phenyl ring, with the other group then added by an appropriate reaction. For example, meta-aminophenol can be alkylated by conversion to the sodium salt in a solvent, such as dimethylformamide. The sodium salt is then reacted with an alkyl halide to obtain the corresponding ether meta-substituted aniline. The urea moiety, when R is mono- or di-substituted amino, is then completed by reaction with an isocyanate or carbamyl chloride. Alternatively, meta-aminophenol can be reacted with an isocyanate to obtain the meta-hydroxy urea. The meta-hydroxy phenyl urea is alkylated in a solvent, such as dimethylformamide. In each instance after the reaction is complete, the recovery of the product is carried out by normal work-up procedures, such as crystallization, sublimation or distillation.

As a further example, meta-aminophenol may be acylated by reaction with the appropriate acid anhydride or acid chloride to yield the hydroxy anilide. The hydroxy anilide can be converted to the corresponding sodium salt and reacted with an appropriate organic halide in a solvent, such as dimethylformamide, to yield the ether meta-substituted anilide. alternatively, meta-aminophenol is converted to the sodium salt in a solvent, such as dimethylformamide. The sodium salt is then reacted with an appropriate organic halide to obtain the corresponding ether meta-substituted aniline. The amino group is then acylated as described above with an appropriate acid anhydride or acid chloride. In each instance after the reaction is complete, the recovery of the product is carried out by normal workup procedures, such as crystallization, sublimation or distillation.

The following illustrated examples describe in detail, without restriction thereto, the preparation of representative compounds.

EXAMPLE I

Preparation of 1(3,3-dimethylbutoxyphenyl)-3-ethyl urea.

Twelve and six-tenths (12.6) grams of 1(3'-hydroxyphenyl)-3-ethyl urea was dissolved in 100 ml. of dimethylformamide and reacted with 15.1 g. of 25 percent sodium methoxide in methanol solution. The methanol was removed by distillation under vacuum and 8.5 g. of 3,3-dimethyl-1-chlorobutane was added and the mixture refluxed for two hours. The reaction mixture was poured into water and crystallized. There was obtained 9.8 g. of the title compound, m.p. 109°–111°C.

EXAMPLE II

Preparation of 1(3'-isobutoxyphenyl)-3,3-dimethyl urea.

The following reactants were combined in 150 ml. of acetone and heated at reflux for five and one-half hours: 11.6 g. isobutoxy aniline, 7.6 g. dimethylcarbamyl chloride, 10 g. anhydrous potassium carbonate powder. After standing overnight, the potassium carbonate was filtered off and the solvent removed under vacuum. After purification, the product obtained (9.4 g.) corresponded to the title compound, m.p. 89°–95°C.

EXAMPLE III

Preparation of 3'-pinacolyl-2-methylvaleranilide.

To 12.4 g. of pinacolyl aniline in 100 ml. of acetone with 7.0 g. of triethylamine present as a catalyst, was added 8.1 g. 2-methylvaleryl chloride. Upon completion of the reaction, there was obtained 16.8 g. of the title compound, $n_D^{30} = 1.5180$.

EXAMPLE IV

Preparation of 3'-neohexyloxy pivalanilide.

To 11.6 g. of neohexyloxy aniline in 100 ml. acetone with 7.0 g. triethylamine as a catalyst, was added 9.0 g. neohexyl chloride. Upon completion of the reaction, there was obtained 16.5 g. of the title compound, $n_D^{30} = 1.5042$.

The following examples are given for the purpose of illustrating the algicidal properties according to the instant invention.

ALGICIDAL TEST PROCEDURE

Sufficient candidate toxicant is diluted in acetone to give an 0.5 percent mixture which is then diluted into 20 milliliters of warm modified Jack Meyers Agar Medium ("Algae Culture from Laboratory to Pilot Plant," 1953, Page 94). The dilutions are such as to give optional concentrations of 0.5, 1.0, 5.0, 10.0 and 50.0 µg/ml. of the test compound in 20 × 100 mm. Petri dishes. After the agar solidifies, separate Petri dishes are innoculated with the desired organism, such as Scenedesmus obliquus or Chlorella pyrenoidosa. The innoculated samples are then allowed to grow at room temperature under fluorescent lamps using a 14 hour light period each day. After one to two weeks, depending upon the growth of the untreated controls, the results are recorded as to the level necessary to control the specific organism. The results obtained with representative compounds and their concentrations are given in Table II.

TABLE II

| COMPOUND NUMBER | ALGICIDE TEST Scenedesmus obliquus (concentration, µg/ml.) |
| --- | --- |
| 1 | 0.5 |
| 2 | 1.0 |

TABLE II-Continued

| COMPOUND NUMBER | ALGICIDE TEST Scenedesmus obliquus (concentration, µg/ml.) |
| --- | --- |
| 3 | 1.0 |
| 4 | (1.0) |
| 5 | 1.0 |
| 6 | (5.0) |
| 7 | (1.0) |
| 8 | 1.0 |
| 9 | (1.0) |
| 10 | 1.0 |
| 11 | 5.0 |
| 12 | 1.0 |
| 13 | (1.0) |
| 14 | (5.0) |
| 15 | 50 |
| 16 | 5.0 |
| 17 | 50 |
| 18 | (5.0) |

( ) denotes partial control at the indicated concentration.

Compounds Number 8 and 10 each exhibited partial control of Chlorella pyrenoidosa at 5.0 µg/ml; Compound Number 7 exhibited complete control at 10 µg/ml.

The manner in which the water area may be treated for the control of algae will vary with the specific problems encountered. An acute problem in the storage and utilization of industrial process water is the fouling of such water and systems in which the water is used by the growth of algae. Entire areas such as a pond or lake may be treated. Drainage ditches and other water-flowing sites may be treated.

In addition to use in ponds and lakes, this invention is applicable to the control of algae in industrial cooling towers and other water recirculating systems as used in paper manufacturing processes, for example.

The substances to be employed according to the present invention can be used as such or in the form of formulations with carrier vehicles. Examples and emulsifiable concentrates, spray powders, pastes, soluble powders, and the like. Suitable carrier vehicles or assistants are mainly: Solvents, such as optionally chlorinated, aromatic hydrocarbons (e.g. xylene, benzene, chlorobenzenes), paraffins (e.g. petroleum fractions), alcohols (e.g. methanol, ethanol, butanol), amines (e.g. ethanolamine, dimethylformamide), as well as water; finely divided solid carriers, for example, natural and synthetic stone meals or powders (kaolin, alumina, chalk, i.e. calcium carbonate, talc, highly disperse silicic acid, silicates, e.g. alkali silicates); emulsifiers, such as non-ionic and anionic emulsifiers (e.g. polyoxyethylene fatty acid esters and polyoxyethylene fatty alcohol ethers, alkyl sulfonates and aryl sulfonates) especially magnesium stearate, sodium oleate, etc., and dispersing agents such as lignin, sulfite waste liquors and methyl cellulose.

As already mentioned above, the active compounds or agents to be employed according to the instant invention can be present in the aforesaid formulations in mixture with one another and with other known active substances.

The algicidal compositions of the invention also comprise aqueous emulsions. The aqueous emulsions can be prepared by dissolving a surfactant of the type noted hereinabove and pouring the emulsifiable concentrate so obtained into water with vigorous agitation. The aqueous emulsions of the invention can also be prepared by dissolving the active ingredient in a watermiscible solvent such as Carbitol (diethylene glycol monoethyl ether), acetone, a lower alkanol, Cellosolve (ethylene glycol monoethyl ether), dioxan, and the like, if desired, in association with a surfactant such as noted above, to obtain an emulsifiable concentrate which is poured into water with vigorous agitation. The aqueous emulsions of the invention can also be prepared by dissolving the active ingredient and a surfactant such as noted above in an organic solvent which is immiscible with water. The resulting emulsifiable concentrate is then admixed with water with vigorous agitation to form an emulsion. The water-immiscible organic solvents which are suitable for use include cyclohexanone, summer oils, aromatic hydrocarbons such as benzene, toluene, xylene, and high-boiling petroleum hydrocarbons such as kerosene, diesel oil, and the like.

The aqueous emulsions of the invention can be supplied to the user in the form of the emulsifiable concentrates described above which require dilution with water before use. Both the concentrated compositions and the diluted compositions are included within the scope of the present invention.

Formulations contain, in accordance with the present invention, in general from 0.1 to 95, preferably 0.5 to 90, per cent by weight of active compound or agent. The agents according to the present invention or their preparations are applied in the usual way, e.g. by spraying, dusting, sprinkling or atomizing. The active substances can be applied, according to the purpose in view, in a concentration of 5 to 0.0005%. In special cases it is, however, possible or even necessary to go below or above these concentrations. The remainder of active algicidal composition being an adjuvant which can be a liquid extending agent or surface active agent, but preferably is an admixture thereof.

Various changes and modifications are possible without departing from the spirit and scope of the invention described herein and will be apparent to those skilled in the art to which it pertains.

What is claimed is:

1. The method for inhibiting and preventing algae growth in water, which comprises adding to the algae environment an algicidally effective amount of a compound of the formula

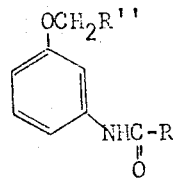

wherein R is selected from the group consisting of alkyl having 1 to 6 carbon atoms, inclusive, and mono- and di-substituted amino, said substituents selected from the group lower alkyl having 1 to 4 carbon atoms, inclusive, alkenyl having 2 to 4 carbon atoms, inclusive, and phenyl; and R'' is selected from the group consisting of alkyl having 1 to 7 carbon atoms, inclusive, alkoxyalkyl having 2 to 6 carbon atoms, inclusive, and alkylcarbonyl having 2 to 6 carbon atoms, inclusive.

2. The method of claim 1 wherein R is alkyl and R'' is alkyl.

3. The method of claim 2 wherein R is 1-methylbutyl and R'' is neopentyl.

4. The method of claim 2 wherein R is 1,1-dimethylbutyl and R'' is neopentyl.

5. The method of claim 2 wherein R is ethyl and R'' is neopentyl.

6. The method of claim 1 wherein R is alkyl and R'' is alkylcarbonyl.

7. The method of claim 6 in which R is 1-methylbutyl and R'' is tertiary-butylcarbonyl.

8. The method of claim 6 in which R is ethyl and R'' is tertiary-butylcarbonyl.

9. The method of claim 6 in which R is isopropyl and R'' is tertiary-butylcarbonyl.

10. The method of claim 6 in which R is tertiarybutyl and R'' is tertiary-butylcarbonyl.

11. The method of claim 1 wherein R is N-monoalkylamino and R'' is alkyl.

12. The method of claim 11 wherein R is N-monoethylamino and R'' is neopentyl.

13. The method of claim 11 wherein R is N-monoethylamino and R'' is neopentyl.

14. The method of claim 11 wherein R is N-monoethylamino and R'' is isopropyl.

15. The method of claim 11 wherein R is N-mono-n-butylamino and R'' is neopentyl.

16. The method of claim 11 wherein R is N-monotertiary-butylamino and R'' is neopentyl.

17. The method of claim 1 wherein R is N-monoalkylamino and R'' is alkylcarbonyl.

18. The method of claim 17 wherein R is N-monomethylamino and R'' is tertiary-butylcarbonyl.

19. The method of claim 1 in which R is N-monoalkenylamino and R'' is alkylcarbonyl.

20. The method of claim 19 wherein R is N-monoallylamino and R'' is tertiary-butylcarbonyl.

21. The method of claim 1 in which R is N,N-dialkylamino and R'' is alkyl.

22. The method of claim 21 wherein R is N,N-dimethylamino and R'' is isopropyl.

23. The method of claim 1 in which R is N-monoalkylamino and R'' is alkoxyalkyl.

24. The method of claim 23 wherein R is N-monoethylamino and R'' is ethoxymethyl.

25. The method of claim 1 in which R is N-monophenylamino and R'' is alkylcarbonyl.

26. The method of claim 25 wherein R'' is tertiarybutylcarbonyl.

27. The method of claim 1 in which R is N,N-dialkylamino and R'' is alkoxyalkyl.

28. The method of claim 27 wherein R is N,N-dimethylamino and R'' is ethoxymethyl.

* * * * *